United States Patent
Kern, II et al.

(10) Patent No.: US 10,645,360 B2
(45) Date of Patent: May 5, 2020

(54) METHODS AND SYSTEMS FOR TRANSMITTING DATA IN A VIRTUAL REALITY SYSTEM

(71) Applicant: Verizon Patent and Licensing Inc., Arlington, VA (US)

(72) Inventors: Richard John Kern, II, Dickson City, PA (US); Nazneen Khan, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 28 days.

(21) Appl. No.: 15/610,599

(22) Filed: May 31, 2017

(65) Prior Publication Data

US 2018/0352207 A1 Dec. 6, 2018

(51) Int. Cl.
| | |
|---|---|
| H04N 7/00 | (2011.01) |
| H04N 13/111 | (2018.01) |
| H04N 13/161 | (2018.01) |
| H04N 13/194 | (2018.01) |
| H04N 13/257 | (2018.01) |
| H04N 13/282 | (2018.01) |
| H04N 5/247 | (2006.01) |
| G06F 3/147 | (2006.01) |
| G06F 3/14 | (2006.01) |

(52) U.S. Cl.
CPC ........... *H04N 13/111* (2018.05); *G06F 3/147* (2013.01); *H04N 5/247* (2013.01); *H04N 13/161* (2018.05); *H04N 13/194* (2018.05); *H04N 13/257* (2018.05); *H04N 13/282* (2018.05); *G06F 3/1454* (2013.01); *G09G 2340/02* (2013.01); *G09G 2340/0428* (2013.01); *G09G 2350/00* (2013.01); *G09G 2370/025* (2013.01)

(58) Field of Classification Search
CPC ........................... H04N 19/597; H04N 13/271
USPC ........................................................ 348/43
See application file for complete search history.

(56) References Cited

U.S. PATENT DOCUMENTS

| | | | | |
|---|---|---|---|---|
| 2010/0111489 | A1* | 5/2010 | Presler | H04N 5/225 386/278 |
| 2013/0127637 | A1* | 5/2013 | Seroussi | H04W 52/0209 340/870.39 |
| 2013/0315473 | A1* | 11/2013 | Takahashi | G06T 15/205 382/154 |
| 2014/0285626 | A1* | 9/2014 | Fu | H04N 19/597 348/46 |

* cited by examiner

Primary Examiner — Richard T Torrente

(57) ABSTRACT

An exemplary method includes a first physical computing device of a virtual reality system acquiring, from a capture device physically disposed at a vantage point in relation to a three-dimensional ("3D") scene, surface data for the 3D scene, the surface data including a first instance of a multi-bit frame, separating the first instance of the multi-bit frame into a most significant byte ("MSB") frame and a least significant byte ("LSB") frame, compressing the MSB frame, and transmitting the LSB frame and the compressed MSB frame to a second physical computing device of the virtual reality system by way of the network interface.

20 Claims, 9 Drawing Sheets

METHODS AND SYSTEMS FOR TRANSMITTING DATA IN A VIRTUAL REALITY SYSTEM

BACKGROUND INFORMATION

Advances in computing and networking technology have made new forms of media content possible. For example, virtual reality media content is available that immerses viewers (or "users") into interactive virtual reality worlds that the users may experience by directing their attention to any of a variety of things being presented in the virtual reality world at the same time. At any time during the presentation of the virtual reality media content by a media player device, a user experiencing the virtual reality media content by way of the media player device may look around the virtual reality world in any direction with respect to both a horizontal dimension (e.g., forward, backward, left, right, etc.) as well as a vertical dimension (e.g., up, down, etc.), giving the user a sense that he or she is actually present in and experiencing the virtual reality world from a particular viewpoint within the virtual reality world.

To facilitate presentation of an virtual reality world by way of a media player device, a server system implemented by a virtual reality media provider may prepare and then transmit data representative of the virtual reality world to the media player device. In some configurations, the server system may include multiple computing devices that each perform one or more operations involved in the preparation of the data. In so doing, it may be desirable to rapidly transmit massive amounts of data between the computing devices by way of one or more network interfaces. Unfortunately, such network interfaces often have bandwidth constraints that undesirably limit data throughput. Such bandwidth constraints could cause delays and/or disruptions in providing a virtual reality experience to a user, especially in scenarios in which the virtual reality media provider is attempting to allow the user to experience events as they occur in real time within an virtual reality world that is representative of a real-world scene.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
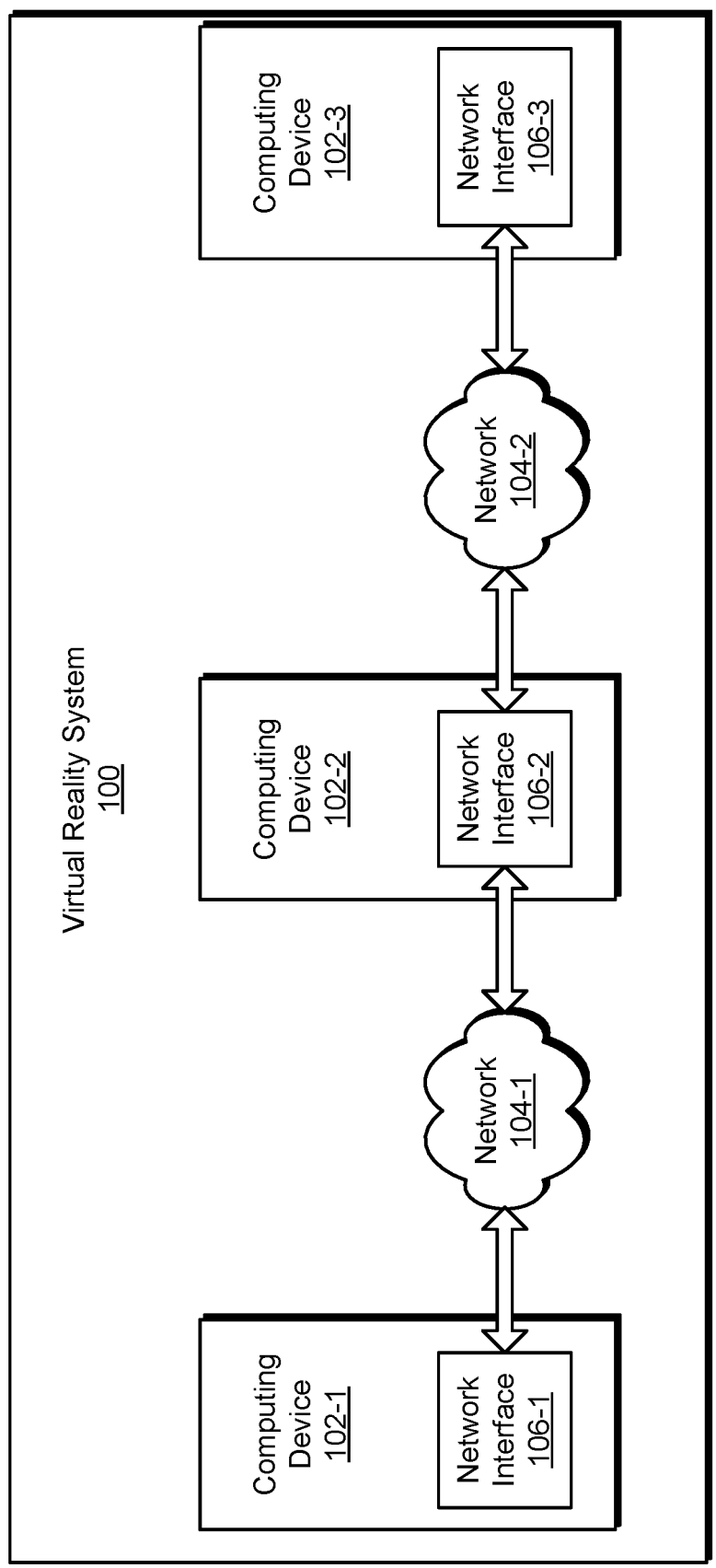
FIG. 1 illustrates an exemplary virtual reality system according to principles described herein.

Methods and systems for transmitting data in a virtual reality system are described herein. The methods and systems described herein may be particularly beneficial when utilizing a bandwidth-limited network interface. In certain exemplary methods and systems, a first computing device of a virtual reality system may acquire surface data (e.g., 2D color data and depth data) for a 3D scene (e.g., a real-world scene) from a capture device (e.g., a video camera, 3D depth scanning hardware, etc.) physically disposed at a vantage point in relation to the 3D scene. The acquired surface data may include a first instance of a multi-bit frame (e.g., a 16-bit depth frame that represents spatial positions of one or more objects within the 3D scene). The first computing device may separate the first instance of the multi-bit frame into a most significant byte ("MSB") frame and a least significant byte ("LSB") frame, and then compress the MSB frame. The first computing device may then transmit the LSB frame and the compressed MSB frame to the second computing device of the virtual reality system by way of the network interface.

As will be described in more detail below, the second computing device may receive the LSB frame and the compressed MSB frame that are transmitted by way of the network interface and uncompress the compressed MSB frame. The second computing device may combine the uncompressed MSB frame with the received LSB frame into a second instance of the multi-bit frame. The second computing device may then perform one or more processing operations on the second instance of the multi-bit frame.

The methods and systems described herein may facilitate transmission of relatively large amounts of data between computing devices of a virtual reality system in a relatively short amount of time by way of a network interface that is bandwidth limited. This may, in turn, minimize delay and/or interruption with band width limiting issues and throughput that may occur during presentation of virtual reality content to a user.

Moreover, the methods and systems described herein may leverage existing graphics hardware included in the computing devices of the virtual reality system to effectively perform the compression operations described herein. For example, as will be described in more detail below, the computing devices may each include a video codec capable of compressing data in accordance with a lossless video compression heuristic. The video codecs may be used to losslessly compress the MSB frames, thereby reducing the amount of data that needs to be transmitted by way of the network interfaces included in the virtual reality system in order to effectively transmit the multi-bit frames.

To illustrate various benefits provided by the methods and systems described herein, an example will now be provided. In this example, the virtual reality system includes first and second computing devices interconnected by way of a network interface that has a one gigabit/second bandwidth constraint. Each computing device in this example includes graphics hardware capable of losslessly compressing data frames that have up to eight bits.

The first computing device may continuously acquire surface data including a plurality of 16-bit depth frames from a plurality of capture devices physically disposed at various vantage points in relation to a 3D scene. As will be described below, each 16-bit depth frame may include a plurality of pixels that are each represented by a 16-bit word (i.e., value). It may be desirable for the first computing device to transmit, by way of the bandwidth-limited network interface, the acquired surface data to the second computing device for processing. However, the quantity of surface data acquired by the first computing device may exceed the one gigabit/second bandwidth constraint such that if all of the surface data were transmitted in raw form, the first computing device could not transmit the surface data fast enough (e.g., at a high enough bit rate) to the second computing device in order to comply with throughput requirements associated with providing a virtual reality experience for a user.

Hence, the methods and systems described herein may leverage the data compression capability of the first computing device in order to compress at least some of the surface data such that all of the surface data may be transmitted from the first computing device to the second computing device by way of the network interface within an acceptable amount of time. However, if the graphics hardware of the first computing device is only capable of losslessly compressing up to 8-bit frames (i.e., frames that have pixels represented by 8-bit words), the first computing device may first separate each 16-bit depth frame into an 8-bit MSB frame and an 8-bit LSB frame. Because, as will be described below, the bits in the MSB frames generally exhibit relatively low variability from frame to frame and/or from pixel to pixel within a particular frame, the first computing device may use its graphics hardware to losslessly compress each of the MSB frames, thereby significantly reducing the amount of data that needs to be transmitted by way of the network interface to the second computing device in order to effectively transmit the MSB to the second computing device. In contrast, because the bits in the LSB frames generally exhibit relatively high variability from frame to frame and/or from pixel to pixel within a particular frame, the first computing device may abstain from losslessly compressing the LSB frames (compressing highly variable data frames would not result in much data size savings). The first computing device may transmit the compressed MSB frames and the raw LSB frames by way of the network interface, thereby effectively transmitting the 16-bit depth frames within the bandwidth constraints of the network interface. Because the MSB frames were losslessly compressed, the second computing device may uncompress them and recombine them with their corresponding LSB frames in order to recreate exact instances of the 16-bit depth frames and subsequently process them as needed.

The methods and systems described herein may provide additional or alternative benefits as may serve a particular implementation. Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality system 100 ("system 100") that may generate and provide virtual reality content in accordance with methods and systems described herein. As shown, system 100 may include, without limitation, a plurality of computing devices 102 (e.g., computing device 102-1 through computing device 102-3) that each connect to one or more networks 104 (e.g., networks 104-1 through 104-2) by way of a network interface 106 (e.g., network interfaces 106-1 through 106-3).

Each computing device 102 is a physical computing device with processing capabilities. For example, each computing device 102 may include graphics hardware configured to perform compression, uncompression, encoding, and/or decoding. The graphics hardware may include one or more physical graphics processing units ("GPUs"), codecs, and/or other components configured to perform the data compression, uncompression, encoding, and/or decoding. Each computing device 102 may additionally or alternatively include one more physical processors and/or other components configured to separate multi-bit frames into MSB and LSB frames, and to recombine MSB and LSB frames into multi-bit frames. Each computing device 102 may additionally or alternatively be configured to maintain and/or execute computer-readable instructions (e.g., software) configured to perform any of the operations described herein.

In certain examples, each computing device included in computing devices 102 may be located at the same location (e.g., in the same building, server facility, etc.). Alternatively, computing devices 102 may be distributed across multiple locations (e.g., in different buildings, server facilities, etc.). In either configuration, computing devices 102 are configured to communicate one with another by way of one or more of networks 104.

Networks 104 may each include a provider-specific wired or wireless network (e.g., a cable or satellite carrier network or a mobile telephone network), the Internet, a wide area network, a local area network, a content delivery network, or any other suitable network. Data may flow between computing devices 102 by way of networks 104 using any communication technologies, devices, media, and protocols as may serve a particular implementation.

To facilitate communication via networks 104, each computing device 102 may include a network interface 106. Each network interface 106 may include one or more components (e.g., an Ethernet port) that computing devices 102 may use to transmit or receive surface data over at least one of networks 104. A "network interface" may additionally or alternatively refer to any component located within networks 104 that facilitates the transmission of data therethrough.

Any of the network interfaces described herein, including network interfaces 106, may be bandwidth limited. In other words, each network interface may be associated with a maximum data transfer rate at which the network interface is capable of transmitting data. For example, a network interface associated with computing device 102-1 (e.g., network interface 106-1) may have a maximum transfer rate of one gigabit/second. This maximum transfer rate may dynamically change (e.g., based on network conditions, network traffic, etc.). As described above, a maximum transfer rate (i.e., a bandwidth constraint) of a network interface may limit the amount of surface data that a computing device (e.g., computing device 102-1) may transmit to another computing device (e.g., computing device 102-2) in a given amount of time.

Each computing device 102 may be configured to perform a different operation with respect to data associated with a virtual reality experience (e.g., surface data) that is ultimately delivered by way of a media player device. Various exemplary operations that may be performed by computing devices 102 will now be described.

Figure 2:
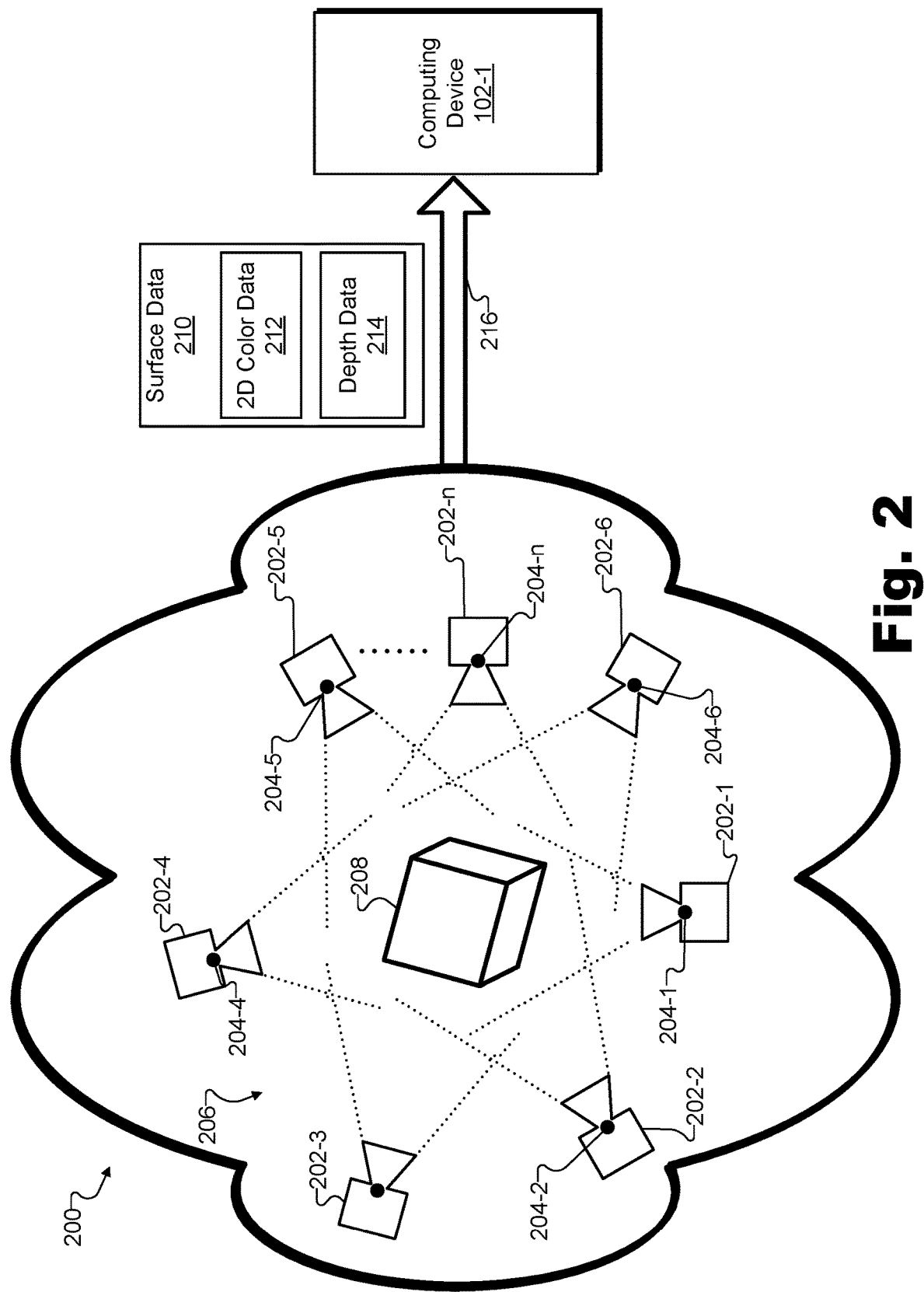
FIG. 2 illustrates an exemplary implementation in which a computing device acquires surface data from one or more capture devices according to principles described herein.

In some examples, computing device 102-1 may acquire surface data for a 3D scene from one or more capture devices configured to generate the surface data. To illustrate, FIG. 2 shows an exemplary configuration 200 in which a plurality of capture devices 202 (e.g., capture devices 202-1 through 202-*n*) are physically disposed at different vantage points (e.g., vantage points 204-1 through 204-n) in relation to a 3D scene 206 that includes an object 208. As will be described below, computing device 102-1 may acquire surface data 210 for 3D scene 206 from capture devices 202.

In certain examples, 3D scene 206 may be a real-world scene, such as a 3D scene of a real-world event that may be occurring live (e.g., in real time). In such examples, 3D scene 206 may include one or more real-world objects (e.g., object 208) associated with the real-world event, and surface data 210 may be captured by capture devices 202 in real time as the real-world event occurs. In other examples, 3D scene 206 may be a virtual scene that includes one or more virtual objects. In other examples, 3D scene 206 may be a merged-reality scene that includes at least one virtual object and at least one real-world object. 3D scene 206 may be considered a 3D scene because each object and/or surface in the 3D scene, whether real or virtual, has a detectable position in 3D space with respect to the 3D scene and other objects in the 3D scene.

Objects (e.g., object 208) within 3D scene 206 may include anything that is visible (i.e., non-transparent) from a particular vantage point in 3D scene 206, whether living or inanimate. For example, if 3D scene 206 corresponds to a real-world event such as a basketball game, objects may include the basketball being used for the game, the basketball court, the basketball standards (i.e., the backboards, rims, nets, etc.), the players and referees participating in the game, and/or any other object present at and/or associated with the basketball game.

Capture devices 202 may each include any combination of components configured to acquire surface data 210 for 3D scene 206. For example, capture devices 202 may each include one or more 2D video cameras, 3D depth scanners, combination capture devices (e.g., devices configured to capture both 2D video and associated depth data), and so forth. Each capture device 202 may capture surface data 210 for 3D scene 206 from a particular vantage point 204 in relation to 3D scene 206. As used herein, a "vantage point" refers to a position and capture angle at which surface data for a 3D scene is captured by a particular capture device. In certain examples, the vantage point of a particular capture device may be fixed (i.e., the position of the particular capture device and the capture angle of the particular capture device do not change over time). Alternatively, one or more of the position and the capture angle of a particular capture device may change over time. For example, the position and/or the capture angle of a particular capture device may change over time as an apparatus to which the particular capture device is fixed moves in relation to the 3D scene. In some examples, capture devices 202 are included in system 100 (e.g., managed by the same entity that manages computing devices 102). Alternatively, capture devices 202 may be separate from system 100 (e.g., managed by an entity other than the entity that manages computing devices 102).

Surface data 210 may include 2D color data 212 and/or depth data 214. As used herein, "2D color data" captured by a capture device may broadly include any data representative of how a 3D scene appears from a vantage point of the capture device. The 2D color data may include a color (e.g., red, green, blue, etc.) representation of the 3D scene, a black and white representation of the 3D scene, a greyscale representation of the 3D scene, and/or any other suitable representation of the appearance of the 3D scene. In certain examples, the 2D color data may include a captured sequence of images (e.g., high-resolution still images) representative of the appearance of the 3D scene (e.g., an object at a real-world event) from a vantage point over a particular time period. For instance, the 2D color data may include 2D color video data of the 3D scene in which a frame of video represents color values at pixel coordinates of the frame. In certain examples, the 2D color data may be included in and/or represented by a plurality of multi-bit frames (e.g., three 8-bit color frames). However, the 2D color data is not limited to any particular format, file type, frame rate, resolution, quality level, or other characteristic that may be associated with various definitions and/or standards defining video in the art.

As used herein, "depth data" may broadly include any data representative of spatial positions of one or more objects (e.g., one or more objects at a real-world event) within the 3D scene. The depth data may be formatted in any suitable manner. In certain examples, as will be described below, the depth data may be formatted as a series of sequential 2D depth data captures (e.g., separate instances of depth data captured at particular times) from a particular vantage point. For instance, the depth data may include 2D depth video data of the 3D scene from a particular vantage point and in which a frame of video represents depth values at pixel coordinates of the frame. In certain examples, the depth data may be included in and/or represented by a multi-bit depth frame (e.g., a 16-bit depth frame). However, the depth data is not limited to any particular format, file type, frame rate, resolution, quality level, or other characteristic that may be associated with various definitions and/or standards defining video in the art.

The depth data 214 may be synchronized with the 2D color data 212. For example, a depth frame and a 2D color frame may correspond with a common instance in time (e.g., a same reference signal, timestamp, capture time, etc.). Such a corresponding depth frame and 2D color frame may form a pair of synchronized frames that, together with synchronized pairs of other depth and 2D color frames captured from other vantage points, and with corresponding metadata, may be processed by a media player device to at least partially construct a 3D representation of 3D scene 206, as described herein.

As indicated by arrow 216, computing device 102-1 may acquire surface data 210 generated by each of capture devices 202. Computing device 102-1 may acquire surface data 210 directly or indirectly from capture devices 202 using any suitable data communication channels and/or technologies. In certain examples, computing device 102-1 may acquire surface data 210 from capture devices 202 through one or more suitable data communication networks. For example, computing device 102-1 may receive at least some of surface data 210 by way of a content delivery network ("CDN") such a CDN capable of carrying streaming video and/or other data.

As mentioned, surface data 210 may be represented by multi-bit frames. For example, 2D color data 212 may be represented by one or more 2D color frames and depth data 214 may be represented by one or more depth frames.

Figure 3:
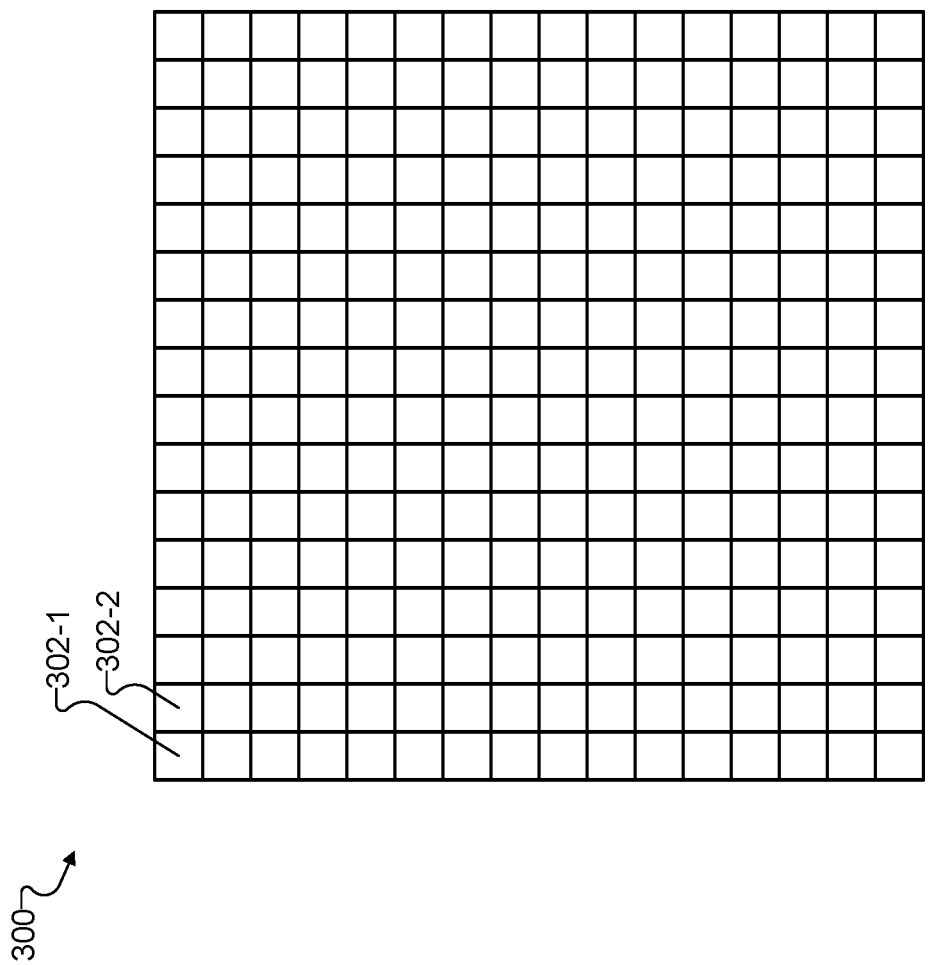
FIG. 3 shows an exemplary multi-bit frame according to principles described herein.

FIG. 3 shows an exemplary multi-bit frame 300 that may represent any type of data (e.g., 2D color data 212 and/or depth data 214) that may be transmitted between and/or processed by computing devices 102 according to principles described herein. As shown in FIG. 3, multi-bit frame 300 may include a plurality of pixels 302 (e.g., 302-1, 302-2, etc.), also referred to as samples, that each represent a portion (e.g., 2D coordinates) of 3D scene 206 as captured by a particular capture device (e.g., capture device 202-1) at a particular time. Multi-bit frame 300 may include any number of pixels and be of any suitable pixel resolution as may serve a particular implementation.

Each pixel 302 may be represented by a multi-bit word (i.e., value). For example, if multi-bit frame 300 is an n-bit frame, the pixels 302 within multi-bit frame 300 may each be represented by an n-bit word. To illustrate, if multi-bit frame 300 is a 16-bit frame, each pixel 302 is represented by a 16-bit word. As another example, if multi-bit frame 300 is an 8-bit frame, each pixel 302 is represented by an 8-bit word.

As will be described in more detail below, a multi-bit frame, such as multi-bit frame 300, may be divided into an MSB frame and an LSB frame. The MSB and LSB frames may each include the same number of pixels as their corresponding multi-bit frame. However, the words representing each pixel in the MSB and LSB frames may each include a smaller number of bits than a corresponding multi-bit word included in the multi-bit frame. For example, if multi-bit frame 300 is a 16-bit frame, multi-bit frame 300 may be divided into an 8-bit MSB frame and an 8-bit LSB frame, which may each include 8-bit words that represent the pixels included therein. For example, the 8-bit MSB frame may include an 8-bit word that represents a pixel included in the 8-bit MSB frame and that has the same coordinates as a pixel (e.g., pixel 302-1) that is included in multi-bit frame 300 and that is represented by a corresponding 16-bit word included in multi-bit frame 300. This example is provided for illustrative purposes only. It is understood that multi-bit frame 300 may be divided into an MSB frame and an LSB frame that may each include words of any suitable number of bits. In addition, it is understood that the size of the words included in the MSB frame need not be the same as the size of the words included in the LSB frame. That is, in certain implementations, the MSB frame may include words having a different number of bits (i.e., length) than the words included in the LSB frame.

As used herein, a "byte" may refer to a group of binary digits or bits that may be operated on as a unit. A byte may have any suitable number of bits as may serve a particular implementation. For example, a byte may have 8 bits, 6 bits, 4 bits or any other suitable number of bits.

For illustrative purposes, the surface data 210 acquired by computing device 102-1 includes a first instance of a multi-bit frame (e.g., multi-bit frame 300) that will be separated by computing device 102-1 into an MSB frame and an LSB frame, as will be described below. As used herein, an "instance" of a multi-bit frame refers to a particular version of the multi-bit frame. For example, the first instance of the multi-bit frame that is acquired by computing device 102-1 may include the original multi-bit frame as captured by a capture device 202. Subsequent instances of the multi-bit frame, as referred to herein, may be identical to the first instance of the multi-bit frame or processed versions of the multi-bit frame. Hence, a subsequent instance of a multi-bit frame may include different bits compared to the first instance of the multi-bit frame even though each instance is representative of the same frame.

Figure 4:
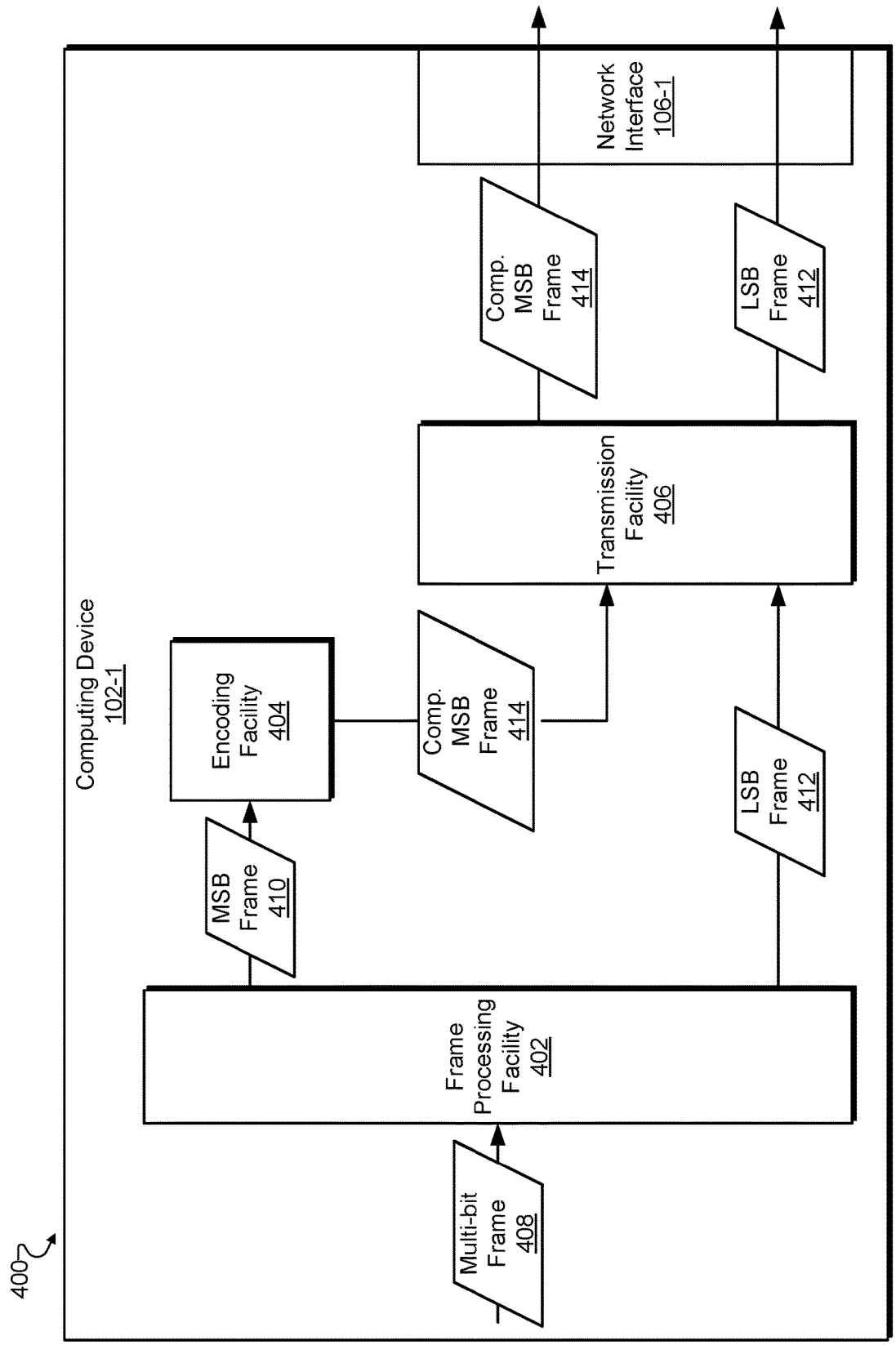
FIG. 4 illustrates an exemplary implementation of a computing device included in the virtual reality system of FIG. 1 according to principles described herein.

FIG. 4 shows an exemplary configuration 400 of computing device 102-1 in which computing device 102-1 acquires a multi-bit frame from one of capture devices 202 and performs various operations on the multi-bit frame. As shown, computing device 102-1 may include a frame processing facility 402, an encoding facility 404, a transmission facility 406, and network interface 106-1. Each of facilities 402 through 406 may be implemented by any combination of hardware and software. It will be recognized that although facilities 402 through 406 are shown to be separate facilities in FIG. 4, facilities 402 through 406 may be combined into fewer facilities, such as into a single facility, or divided into more facilities as may serve a particular implementation. Each of facilities 402 through 406 will now be described in more detail.

As shown, frame processing facility 402 may receive a multi-bit frame 408 (i.e., a first instance of multi-bit frame 408). As described above, multi-bit frame 408 may be acquired from one of capture devices 202. Multi-bit frame 408 may be any n-bit frame (e.g., similar to multi-bit frame 300), where n is greater than one. For example, multi-bit frame 408 may be a 16-bit depth frame, a 30-bit depth frame, a 64-bit depth frame, etc., as generated by one of capture devices 202.

Frame processing facility 402 may be configured to perform various processing operations with respect to multi-bit frame 408. For example, frame processing facility 402 may separate multi-bit frame 408 into an MSB frame 410 and an LSB frame 412. This separation of multi-bit frame 408 may be performed in any suitable manner. For example, frame processing facility 402 may separate a multi-bit word that represents a pixel in multi-bit frame 408 into a MSB word and an LSB word. Each MSB word may include a predetermined number of most significant bits included in the multi-bit word. Each LSB word may include a predetermined number of least significant bits included in the multi-bit word. Hence, if multi-bit frame 408 is an n-bit frame (i.e., each pixel included in multi-bit frame 408 is represented by n bits), MSB frame 410 may be an x-bit frame (i.e., each pixel included in MSB frame 410 is represented by x bits) and LSB frame 412 may be a y-bit frame (i.e., each pixel included in LSB frame 412 is represented by y bits), where x and y are both less than n, and where x plus y is equal to n.

To illustrate, if multi-bit frame 408 is a 16-bit frame, frame processing facility 402 may separate multi-bit frame 408 into an 8-bit MSB frame 410 (i.e., a frame that has pixels represented by 8-bit MSB words) and an 8-bit LSB frame 412 (i.e., a frame that has pixels represented by 8-bit LSB words). Alternatively, frame processing facility 402 may divide multi-bit frame 408 into any other suitably sized MSB frame 410 and LSB frame 412 (e.g., into a 6-bit MSB frame 410 and a 10-bit LSB frame 412).

In some examples, frame processing facility 402 may determine whether to separate a particular multi-bit frame received from one of capture devices 202 based on a compression capability of encoding facility 404 and/or on a bandwidth limitation of one or more network interfaces 106 (e.g., network interface 106-1). For example, encoding facility 404 may be capable of compressing data frames that are up to a particular number of bits (e.g., 8-bit frames). This means that if a particular data frame is a higher bit frame than this particular number, encoding facility 404 may not be capable of processing (i.e., compressing) the particular data frame. Hence, if frame processing facility 402 determines that multi-bit frame 408 is a higher bit frame than what encoding facility 404 is capable of handling, frame processing facility 402 may be configured to separate the multi-bit frame 408 into smaller sized MSB and LSB frames that encoding facility 404 can handle.

To illustrate, encoding facility 404 may be capable of compressing data frames that are up to eight bits (i.e., an 8-bit frame). If multi-bit frame 408 is a 16-bit frame, frame processing facility 402 may separate multi-bit frame 408 into an 8-bit MSB frame 410 and an 8-bit LSB frame 412. Continuing with this example, if frame processing facility 402 receives a multi-bit frame that is of eight bits or less (e.g., an 8-bit 2D color frame), frame processing facility 402 may abstain from separating the multi-bit frame into MSB and LSB frames (either because frame separation is not needed for encoding facility 404 to handle the multi-bit frame or because it may not be necessary to compress the multi-bit frame).

In certain examples, encoding facility 404 may be implemented by graphics hardware (e.g., one or more physical GPUs, codecs, and/or other components) configured to perform data compression, uncompression, encoding, and/or decoding. Alternatively, encoding facility 404 may be provided as a stand-alone encoding facility (i.e., provided separately from a GPU). As mentioned, encoding facility 404 may be limited in the number of bits that it can compress in any given operation. For example, encoding faculty 404 may be capable of processing (e.g., compressing) data frames of up to eight bits.

In some examples, the compression performed by encoding facility 404 is lossless. As used herein, "lossless compression" refers to a type of compression that allows original data to be perfectly reconstructed from the compressed data. For example, encoding facility 404 may losslessly compress data in accordance with a block-oriented motion-compensation-based video compression standard (e.g., H.264), in accordance with High Efficiency Video Coding (HEVC) (e.g., H.265), in accordance with an open source-based alternative to proprietary video compression standards, or in accordance with any other suitable video compression standard.

As shown in FIG. 4, MSB frame 410 may be input into encoding facility 404, which may compress MSB frame 410 and output a compressed MSB frame 414. Compressed MSB frame 414 may then be provided to transmission facility 406. As also shown, LSB frame 412 is not input into encoding facility 404. Rather LSB frame 412 (i.e., in its raw form) is provided directly to transmission facility 406. As described above, the bits in LSB frame 412 may exhibit relatively high variability from frame to frame and/or from pixel to pixel within a frame. Hence, compressing LSB frame 412 may not result in much bandwidth savings when transmitting LSB frame 412. However, it will be recognized that in some alternative embodiments, LSB frame 412 may be compressed by encoding facility 404 prior to being provided to transmission facility 406.

Transmission facility 406 may be implemented by one or more components configured to transmit data by way of network interface 106-1. As shown, transmission facility 406 may transmit compressed MSB frame 414 and LSB frame 412 in an uncompressed state by way of network interface 106-1 to another computing device (e.g., computing device 102-2). Because MSB frame 414 is compressed, such transmission may be within the bandwidth constraints of network interface 106-1, as described above.

It will be recognized that other data included in surface data 210 may also be received, processed, and transmitted by computing device 102-1. For example, multi-bit frames representative of 2D color data 212 may be received and transmitted by computing device 102-1 by way of network interface 106-1. In some examples, computing device 102-1 abstains from separating and compressing these multi-bit frames representative of 2D color data 212 before transmitting them. Alternatively, one or more of the multi-bit frames representative of 2D color data 212 may be separated into MSB and LSB frames and then compressed prior to being transmitted by way of network interface 106-1.

Figure 5:
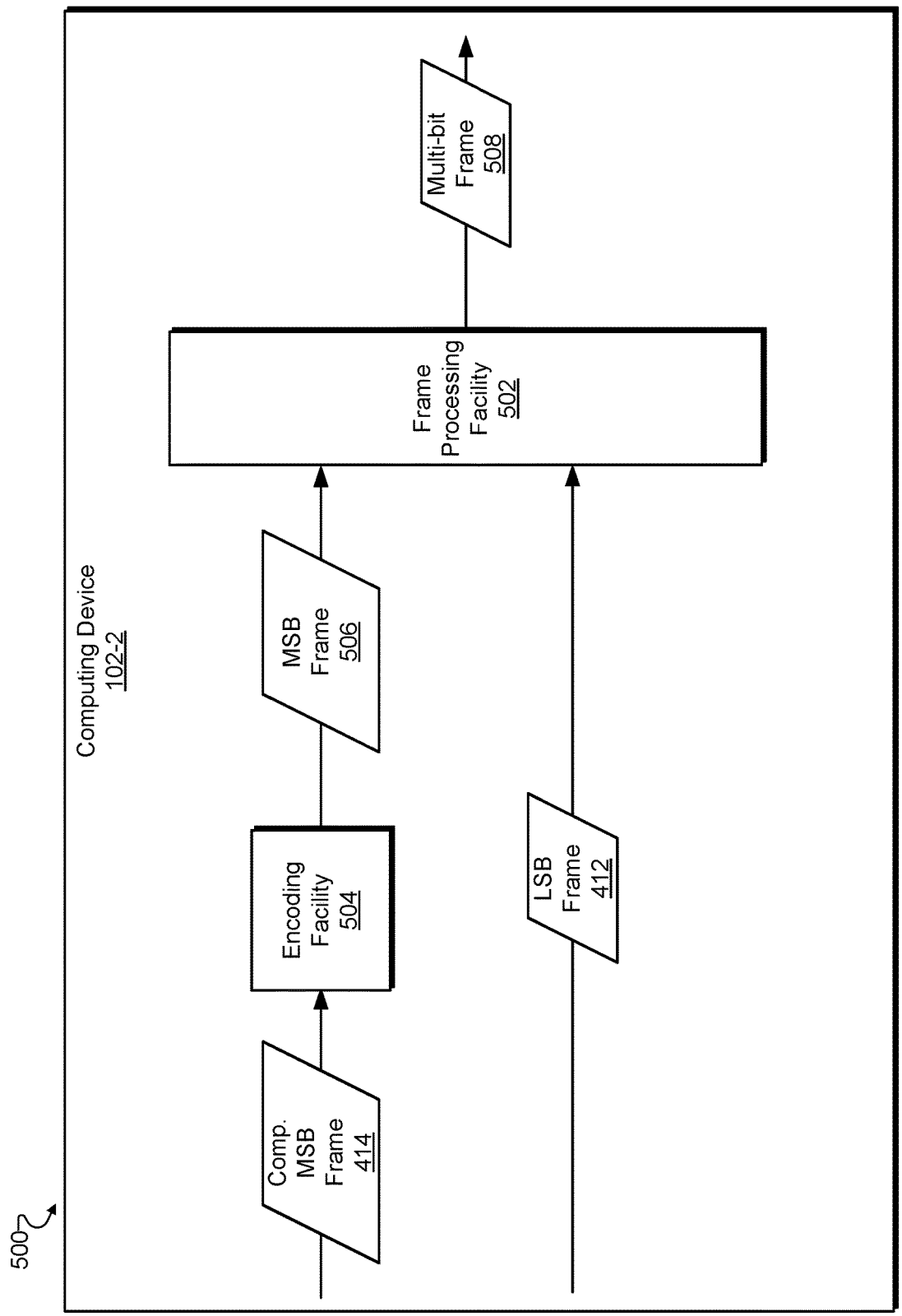
FIG. 5 illustrates another exemplary implementation of a computing device included in the virtual reality system of FIG. 1 according to principles described herein.

FIG. 5 shows an exemplary configuration 500 of computing device 102-2 in which computing device 102-2 receives compressed MSB frame 414 and LSB frame 412 as transmitted by computing device 102-1 by way of network interface 106-1. As shown, computing device 102-2 may include a frame processing facility 502 and an encoding facility 504, which may, in some examples, have similar capabilities as frame processing facility 402 and encoding facility 404, respectively. Computing device 102-2 may include other facilities and/or components similar to computing device 102-1 (e.g., a transmission facility similar to transmission facility 406), but these are not shown in FIG. 5.

As shown, the compressed MSB frame 414 received from computing device 102-1 is input into encoding facility 504, which uncompresses the compressed MSB frame 414 and outputs MSB frame 506. MSB frame 506 is an uncompressed version of compressed MSB frame 414 and, in some instances, is an exact replica of MSB frame 410.

As shown, MSB frame 506 and LSB frame 412 are input into frame processing facility 502, which combines MSB frame 506 and LSB frame 412 into a multi-bit frame 508. Multi-bit frame 508 is a second instance of multi-bit frame 408. As described above, this means that multi-bit frame 508 and multi-bit frame 408 each represent the same frame, even though multi-bit frame 508 and multi-bit frame 408 may or may not be exact replicas of each other. Frame processing facility 502 may combine MSB frame 506 and LSB frame 412 in any suitable manner. For example, frame processing facility 502 may combine MSB frame 506 and LSB frame 412 by combining corresponding MSB and LSB words included in MSB frame 506 and LSB frame 412, respectively, into multi-bit words that are included in multi-bit frame 508.

Once MSB frame 506 and LSB frame 412 have been combined into multi-bit frame 508, computing device 102-2 (e.g., frame processing facility 502 and/or any other component of computing device 102-2) may perform one or more processing operations on multi-bit frame 508. Such processing operations may vary depending on the particular implementation. For example, computing device 102-2 may prepare multi-bit frame 508 for an encoding operation that will take place at a subsequent processing stage by a different computing device (e.g., computing device 102-3). Subsequent to the one or more processing operations being performed, computing device 102-2 may separate multi-bit frame 508 into MSB and LSB frames and transmit the MSB and LSB frames to an additional computing device (e.g., computing device 102-3) in a similar manner as that described above in connection with computing device 102-1. The additional computing device may receive, combine, and process the MSB and LSB frames generated by computing device 102-2 in a similar manner as that described herein.

Figure 6:
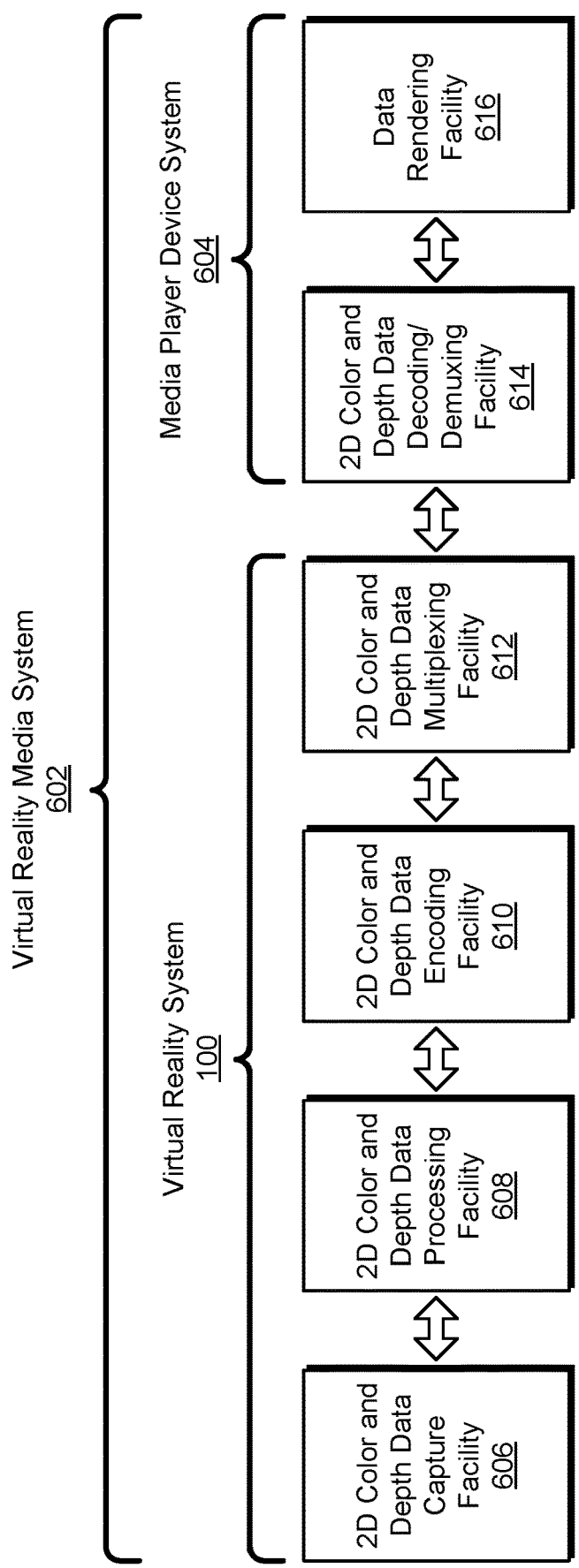
FIG. 6 illustrates an exemplary virtual reality media system according to principles described herein.

An exemplary context within which the methods and systems described herein may be used will now be described. In certain examples, virtual reality system 100 may be included as part of a virtual reality media system that may generate and provide virtual reality content in any suitable manner, such as described herein. FIG. 6 illustrates an exemplary virtual reality media system 602 that may include, without limitation, virtual reality system 100 and a media player device system 604. Virtual reality system 100 may include, without limitation, a 2D color and depth data capture facility 606, a 2D color and depth data processing facility 608, a 2D color and depth data encoding facility 610, and a 2D color and depth data multiplexing facility 612 selectively and communicatively coupled to one another. It will be recognized that although facilities 606 through 612 are shown to be separate facilities in FIG. 6, facilities 606 through 612 may be combined into fewer facilities, such as into a single facility, or divided into more facilities as may serve a particular implementation. Each of facilities 606 through 612 may include or be housed in a device (e.g., a computing device having a single chassis) and located at a single location or distributed between multiple devices (e.g., servers) and/or multiple locations as may serve a particular implementation. Facilities 606 through 612 may be interconnected by way of one or more network interfaces.

In the exemplary implementation shown in FIG. 6, virtual reality media system 602 may provide a data pipeline for delivery of surface data in which the surface data flows from capture devices (e.g., capture devices 202) to virtual reality system 100 in any suitable manner and from virtual reality system 100 to a media player device by way of a network. For example, virtual reality system 100 may process acquired surface data to generate and provide the surface data in at least one transport stream for streaming to a media player device by way of a network.

In the exemplary implementation shown in FIG. 6, 2D color and depth data capture facility 606 may be implemented by first computing device 102-1, 2D color and depth data processing facility 608 may be implemented by second computing device 102-2, and 2D color and depth data encoding facility 610 and/or 2D color and depth data multiplexing facility 612 may be implemented by third computing device 102-3. In this configuration, surface data (e.g., different instances of a multi-bit frame), or any other type of data described herein, may be passed from stage to stage (i.e., from facility 606 to facility 608 to facility 610 to facility 612) within system 100 in accordance with the methods and systems described herein.

Media player device system 604 may include, without limitation, a 2D color and depth data decoding/demultiplexing facility 614 and a data rendering facility 616 selectively and communicatively coupled to one another. It will be recognized that although facilities 614 and 616 are shown to be separate facilities in FIG. 6, facilities 614 and 616 may be combined into fewer facilities, such as into a single facility, or divided into more facilities as may serve a particular implementation. Each of facilities 614 and 616 may include or be housed in a media player device, such as those described herein. In certain examples, the media player device may be located at a user location (e.g., a user premises such as a residence, a business, etc. or another location associated with the user of the media player device). Each of facilities 606 through 616 will now be described in more detail.

2D color and depth data capture facility 606 ("data capture facility 606") may include any hardware and/or software (e.g., computing systems, video and depth capture equipment, software programs, etc.) used for acquiring virtual reality content representative of a 3D scene (e.g., 3D scene 206).

In certain examples, data capture facility 606 may acquire virtual reality content representative of a 3D scene in real time. For example, if the 3D scene corresponds to a real-world event, data capture facility 606 may acquire virtual reality content representative of the 3D scene in real time as the real-world event occurs. In other examples, data capture facility 606 may acquire virtual reality content that has been previously captured and stored for access and use in a time-shifted manner.

As used herein, "virtual reality content" refers to any data and/or content associated with a 3D scene that may be acquired, generated, and/or transmitted to a media player device configured to use the virtual reality content to render a 3D representation of the 3D scene. For example, the virtual reality content may include surface data associated with the 3D scene, metadata associated with the 3D scene, audio data associated with the 3D scene, and/or any other suitable data associated with the 3D scene. The virtual reality content may include data representative of real-world scene content, virtual content (e.g., one or more virtual objects), or a combination of real-world scene content and virtual content.

Data capture facility 606 may acquire the virtual reality content associated with the 3D scene in any suitable manner, such as described herein.

2D color and depth data processing facility 608 ("data processing facility 608") may include any hardware and/or software (e.g., computing systems, software programs, etc.) used for processing the virtual reality content (e.g., surface data, metadata, etc.) acquired by data capture facility 606. For example, data processing facility 608 may include one or more server systems or other computing devices running specialized and/or general-purpose image processing software. Data processing facility 608 may perform any suitable processing operations to prepare the data acquired by data capture facility 606 to be encoded by 2D color and depth data encoding facility 610. For example, data processing facility 608 may perform a processing operation to put the data into a format that is suitable for encoding, perform a processing operation to correct for lens distortions in the acquired data, perform a processing operation to correct for parallax in the acquired data, perform a processing operation to correct for depth discrepancies and/or orientation discrepancies between capture devices, and/or perform any other suitable processing operation as may suit a particular implementation.

In certain examples, data processing facility 608 may perform a processing operation to format the acquired 2D color data from each capture device into a series of sequential 2D color captures (e.g., a series of frames of video captured by each capture devices). In addition, data processing facility 608 may perform a processing operation to format the depth data from each of the capture devices into a series of sequential 2D depth data captures. As used herein, "a series of sequential 2D depth data captures" refers to separate captures of depth values at different time points in relation to the 3D scene from each capture device. For example, a particular capture device may capture a first set of depth values in relation to the 3D scene at a first time point, a second set of depth values in relation to the 3D scene at a second time point, a third set of depth values in relation to the 3D scene at a third time point, etc. as the series of sequential 2D depth data captures. The series of sequential 2D depth data captures may be considered as "2D" data because each 2D depth data capture only includes depth values captured by a capture device at a particular time point and does not include, for example, a 3D model or a 3D representation of the 3D scene.

In certain examples, data processing facility 608 may perform a processing operation to format metadata acquired by data capture facility 608 into a suitable format for encoding. For example, processing facility 608 may perform a processing operation to format the metadata into a series of sequential metadata captures. Each metadata capture included in the series of sequential metadata captures may include metadata associated with a particular capture device at a particular point in time in relation to the 3D scene. In addition, each metadata capture may be synchronized with a corresponding 2D color data capture and a corresponding 2D depth data capture.

In certain examples, all or part of the data acquired by data capture facility 606 may already be in a format suitable for encoding. Accordingly, in such examples, data processing facility 608 may bypass performing some types of processing operations on the acquired data, or processing facility 608 may be bypassed altogether or omitted from virtual reality media system 602.

2D color and depth data encoding facility 610 ("data encoding facility 610") may include any hardware and/or software (e.g., computing systems, networking systems, software programs, etc.) used for encoding data acquired by data capture facility 606 and/or processed (e.g., generated) by data processing facility 608. For example, data encoding facility 610 may include one or more server systems or other computing devices running specialized and/or general-purpose video encoding software. Data encoding facility 610 may encode surface data for a 3D scene (i.e., surface data acquired by data capture facility 606 and processed by data processing facility 608) using any video codec suitable for generating a color video data stream and a depth video data stream for each capture device. For example, data encoding facility 610 may encode the surface data according to a H.264/MPEG-4 codec, a H.265/MPEG-H codec, or any other suitable codec.

2D color and depth data multiplexing facility 612 ("data multiplexing facility 612") may include any hardware and/or software (e.g., computing systems, networking systems, software programs, etc.) used for packaging the color video data streams and the depth video data streams generated by data encoding facility 610 into a transport stream. For example, data multiplexing facility 612 may include one or more server systems or other computing devices running specialized and/or general-purpose video multiplexing software. Data multiplexing facility 612 may generate a transport stream in any suitable manner. For example, data multiplexing facility 612 may multiplex the color video data streams and the depth video data streams using known multiplexing technologies (e.g., time-division multiplexing).

In certain examples, data multiplexing facility 612 may multiplex the color video data stream and the depth video data stream for each of the capture devices associated with the 3D scene into a transport stream. Data multiplexing facility 612 may then transmit the transport stream to media player device system 604.

Media player device system 604 may receive the streamed transport stream. 2D color and depth data decoding/demultiplexing facility 614 ("data decoding/demultiplexing facility 614") may perform one or more decoding and/or demultiplexing operations on the transport stream. Decoding/demultiplexing facility 614 may include any hardware (e.g., a dedicated graphics card) and/or software (e.g., computing systems, software programs, etc.) used for decoding and demultiplexing the color video data streams and the depth video data streams in the transport stream and the metadata. For example, data decoding/demultiplexing facility 614 may include one or more computing devices running specialized and/or general-purpose video decoding and demultiplexing software.

Data rendering facility 616 may use the decoded/demultiplexed color video data streams, depth video data streams, and metadata to render a 3D representation of a 3D scene in a virtual 3D space. Data rendering facility 616 may include any hardware and/or software (e.g., computing systems, software programs, etc.) used for rendering a 3D representation of the 3D scene. For example, data rendering facility 616 may leverage one or more graphics cards having one or more programmable GPUs to render a 3D representation of the 3D scene.

Figure 7:
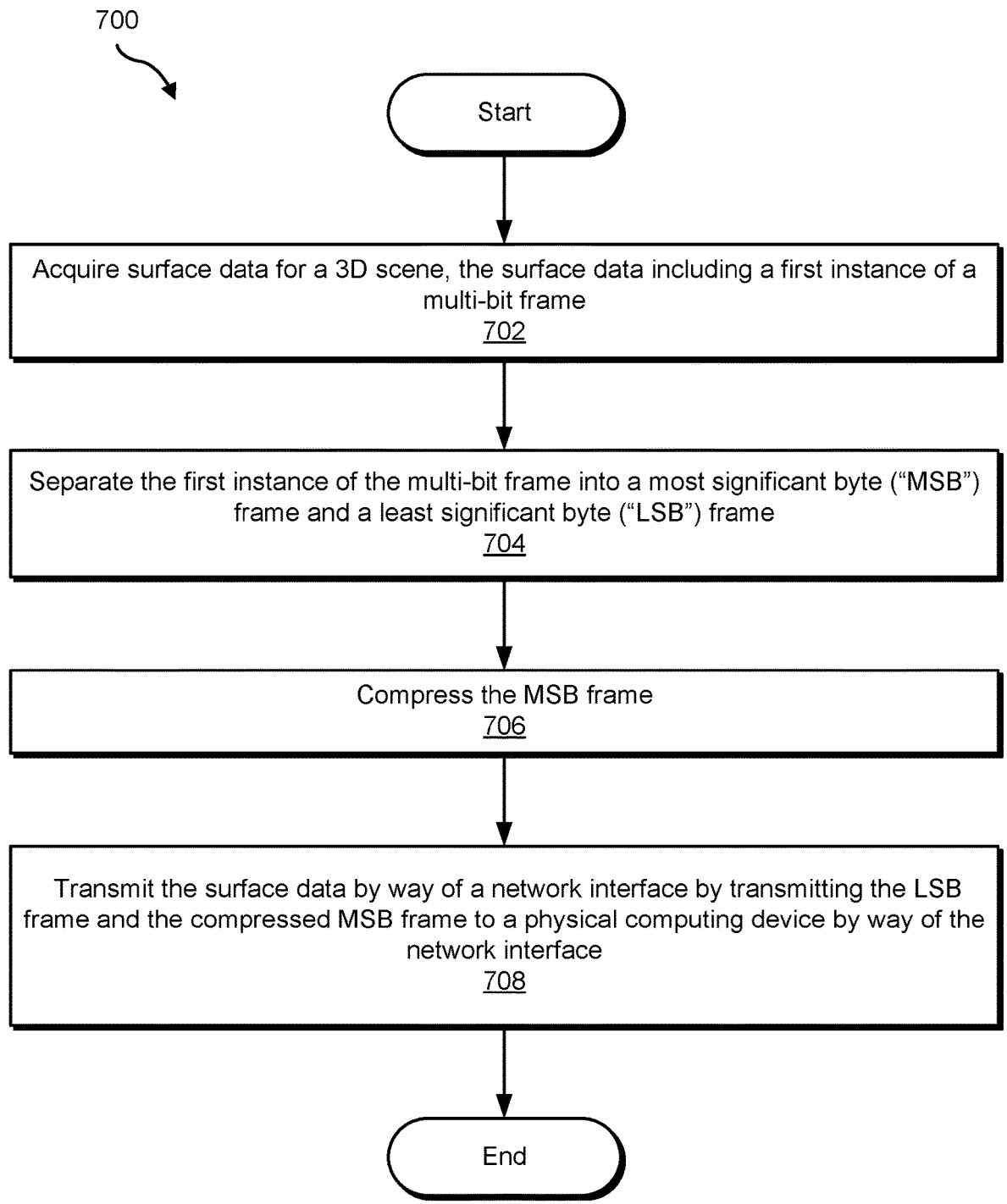
FIGS. 7-8 illustrate exemplary methods for transmitting data in a virtual reality system according to principles described herein.
Figure 8:
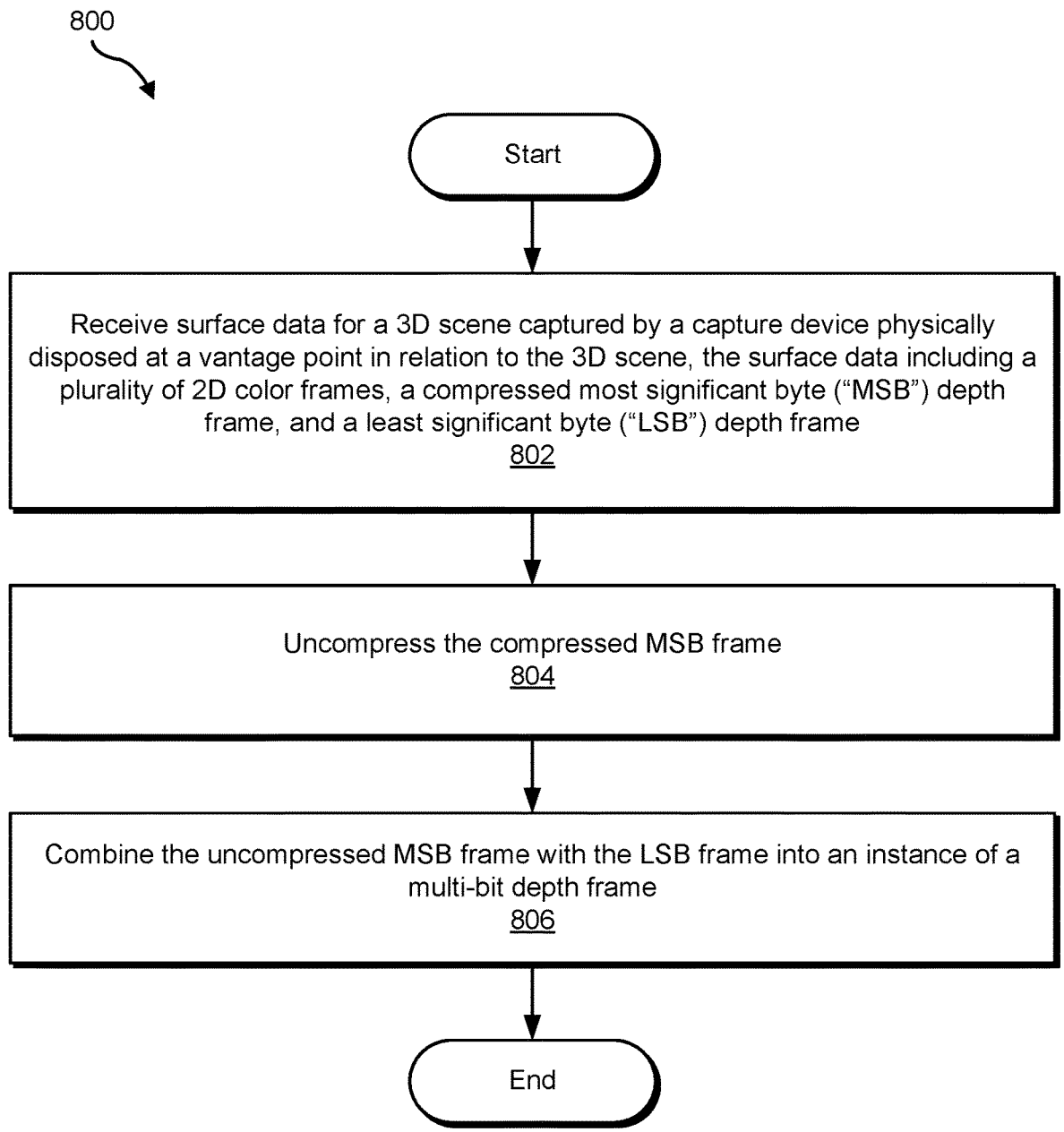

FIGS. 7 and 8 illustrate exemplary methods 700 and 800 for transmitting data in a virtual reality system. While FIGS. 7 and 8 illustrate exemplary operations according to some embodiments, other embodiments may omit, add to, reorder, and/or modify any of the operations shown in FIGS. 7 and 8. One or more of the operations shown in FIGS. 7 and 8 may be performed by virtual reality system 100 and/or any implementation thereof.

In operation 702, a first computing device (e.g. computing device 102-1) of a virtual reality system (e.g., virtual reality system 100) may acquire surface data for a 3D scene. The surface data may include a first instance of a multi-bit frame. In some examples, the first computing device may acquire the surface data from a capture device physically disposed at a vantage point in relation to a 3D scene. Operation 702 may be performed in any of the ways described herein.

In operation 704, the first computing device of the virtual reality system may separate the first instance of the multi-bit frame into a MSB frame and a LSB frame. Operation 704 may be performed in any of the ways described herein.

In operation 706, the first computing device of the virtual reality system may compress the MSB frame. For example, the first computing device may utilize any suitable compression protocol to losslessly compress the MSB frame. Operation 706 may be performed in any of the ways described herein.

In operation 708, the first computing device of the virtual reality system may transmit the surface data by way of a network interface by transmitting the LSB frame and the compressed MSB frame to a second computing device of the virtual reality system by way of the network interface. Operation 708 may be performed in any of the ways described herein.

Turning to FIG. 8, in operation 802, a second computing device (e.g., computing device 102-2) of a virtual reality system (e.g., virtual reality system 100) may receive, from a first computing device (e.g., computing device 102-1) of the virtual reality system, surface data for a 3D scene captured by a capture device physically disposed at a vantage point in relation to the 3D scene. The surface data may include a plurality of 2D color frames, a compressed MSB depth frame, and a LSB depth frame. Operation 802 may be performed in any of the ways described herein.

In operation 804, the second computing device of the virtual reality system may uncompress the compressed MSB frame. Operation 804 may be performed in any of the ways described herein.

In operation 806, the second computing device of the virtual reality system may combine the uncompressed MSB frame with the LSB frame into an instance of a multi-bit depth frame. Operation 806 may be performed in any of the ways described herein.

Although the various operations shown in FIGS. 7 and 8 and described herein are described in the context of a virtual reality system, principles described herein are not limited to such a context. It is understood that principles described herein could be applied when any computing devices transmit data therebetween by way of a network interface.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
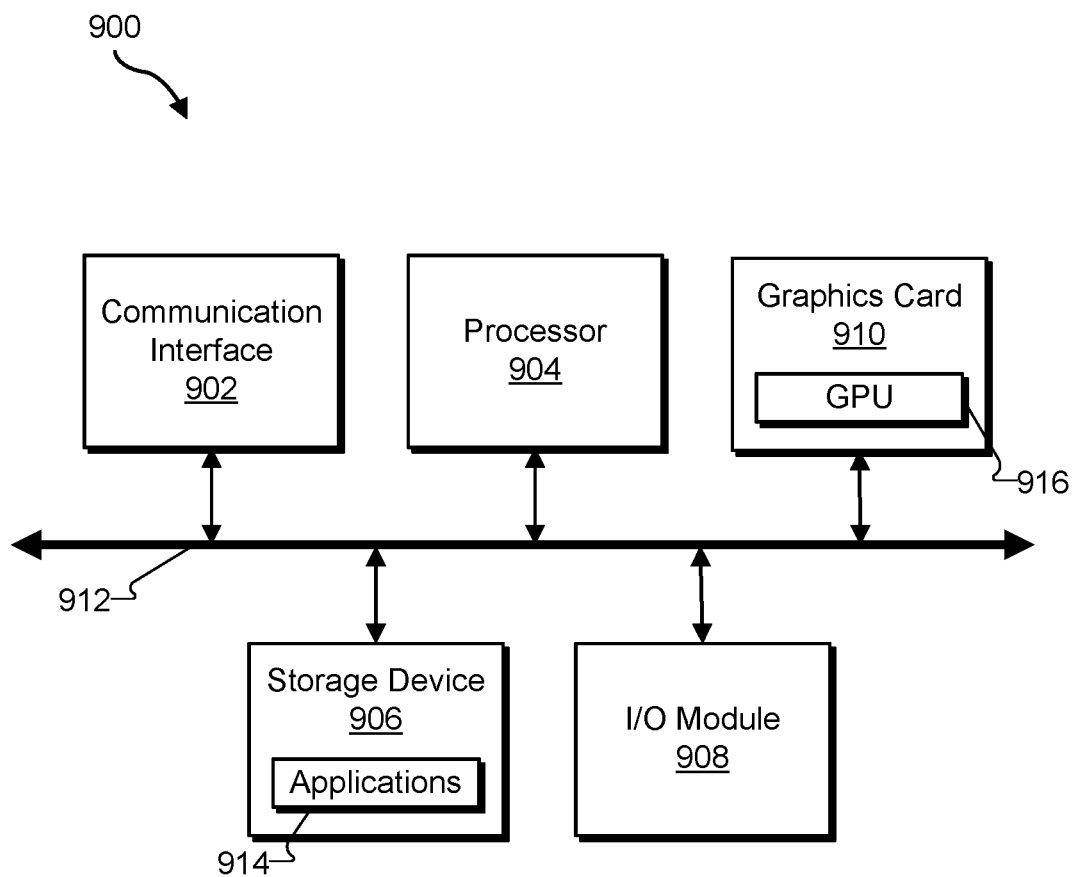
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, an input/output ("I/O") module 908, and a graphics card 910 communicatively connected via a communication infrastructure 912. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit (e.g., a central processing unit) capable of processing data or interpreting, executing, and/or directing execution of one or more of the instructions, processes, and/or operations described herein. Processor 904 may direct execution of operations in accordance with one or more applications 914 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 914 configured to direct processor 904 to perform any of the operations described herein may be stored within storage device 906. In some examples, data may be arranged in one or more databases residing within storage device 906. In certain examples, storage device 906 may maintain surface data, metadata, data streams, video streams, transport streams, and/or any other data received, generated, managed, maintained, used, and/or transmitted by computing devices 102 and/or facilities 606 through 616. The storage facility may further include any other data as may be used by computing devices 102 and/or facilities 606 through 616 to perform one of more of the operations described herein.

I/O module 908 may include one or more I/O modules configured to receive user input and provide user output. One or more I/O modules may be used to receive input for a single virtual reality experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation. I/O module 908 may be omitted from certain implementations.

In some examples, any of the facilities described herein may be implemented by or within one or more components of computing device 900. For example, one or more applications 914 residing within storage device 906 may be configured to direct processor 904 to perform one or more processes or functions associated with computing devices 102 and/or facilities thereof.

Graphics card 910 may include any suitable graphics card (e.g., a commercially available graphics card) having dedicated video decoding hardware (e.g., one or more dedicated video decoders) and a programmable GPU 916. Graphics card 910 may include additional components in certain embodiments. Graphics card 910 and/or GPU 916 may be configured to execute and/or assist processor 904 in executing one or more of the exemplary operations described herein. Graphics card 910 may include any suitable number of graphics cards and/or GPUs as may suit a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    acquiring, by a first physical computing device of a virtual reality system from a capture device physically disposed at a vantage point in relation to a three-dimensional ("3D") scene, surface data for the 3D scene, the surface data including a first instance of a multi-bit frame that includes a first plurality of pixels, each pixel included in the first plurality of pixels being represented by a first multi-bit value;
    separating, by the first physical computing device of the virtual reality system, the first instance of the multi-bit frame into a most significant byte ("MSB") frame and a least significant byte ("LSB") frame;
    compressing, by the first physical computing device of the virtual reality system, the MSB frame; and
    transmitting, by the first physical computing device of the virtual reality system, the surface data to a second physical computing device of the virtual reality system by way of a network interface by transmitting the LSB frame and the compressed MSB frame to the second physical computing device of the virtual reality system by way of the network interface,
    wherein
        the LSB frame is transmitted to the second physical computing device in raw form such that the LSB frame is not modified during a time period between when the LSB frame is separated from the MSB frame and when the LSB frame is transmitted to the second physical computing device,
        the MSB frame includes a second plurality of pixels, wherein each pixel included in the second plurality of pixels is represented by a second multi-bit value,
        the LSB frame includes a third plurality of pixels, wherein each pixel included in the third plurality of pixels is represented by a third multi-bit value,
        each pixel included in the second plurality of pixels in the MSB frame represents a subset of bit positions from a corresponding first multi-bit value included in the first instance of the multi-bit frame, and
        each pixel included in the third plurality of pixels in the LSB frame represents remaining bit positions from the corresponding first multi-bit value included in the first instance of the multi-bit frame that are not included in the subset of the bit positions.

2. The method of claim 1, further comprising:
    receiving, by the second physical computing device of the virtual reality system, the LSB frame and the compressed MSB frame that are transmitted by way of the network interface by the first physical computing device;
    uncompressing, by the second physical computing device of the virtual reality system, the compressed MSB frame received by the second physical computing device of the virtual reality system; and
    combining, by the second physical computing device of the virtual reality system, the uncompressed MSB frame with the LSB frame received by the second physical computing device of the virtual reality system into a second instance of the multi-bit frame.

3. The method of claim 2, further comprising:
    performing, by the second physical computing device of the virtual reality system and subsequent to the second physical computing device receiving the surface data from the first physical computing device, a processing operation on the second instance of the multi-bit frame, the processing operation resulting in a processed second instance of the multi-bit frame;
    separating, by the second physical computing device of the virtual reality system after the performing of the processing operation, the processed second instance of the multi-bit frame into an additional MSB frame and an additional LSB frame;
    compressing, by the second physical computing device of the virtual reality system, the additional MSB frame; and
    transmitting, by the second physical computing device of the virtual reality system, the surface data to a third physical computing device of the virtual reality system by way of an additional network interface by transmitting the additional LSB frame and the additional compressed MSB frame to the third physical computing device of the virtual reality system by way of the additional network interface.

4. The method of claim 3, further comprising:
    receiving, by the third physical computing device of the virtual reality system, the additional LSB frame and the compressed additional MSB frame that are transmitted over the additional network interface by the second physical computing device;
    uncompressing, by the third physical computing device of the virtual reality system, the compressed additional MSB frame received by the third physical computing device of the virtual reality system; and
    combining, by the third physical computing device of the virtual reality system, the uncompressed additional MSB frame with the additional LSB frame received by the third physical computing device of the virtual reality system into a third instance of the multi-bit frame.

5. The method of claim 1, wherein the multi-bit frame represents depth data captured by the capture device from the vantage point in relation to the 3D scene.

6. The method of claim 1, wherein:
    the surface data further includes a plurality of multi-bit frames that include two-dimensional ("2D") color data captured by the capture device from the vantage point in relation to the 3D scene; and
    the transmitting of the surface data to the second physical computing device of the virtual reality system by way of the network interface further comprises transmitting the plurality of multi-bit frames that include the 2D color data to the second physical computing device of the virtual reality system by way of the network interface.

7. The method of claim 1, wherein the transmitting of the LSB frame and the compressed MSB frame to the second physical computing device of the virtual reality system by way of the network interface comprises transmitting the LSB frame in an uncompressed state.

8. The method of claim 1, wherein the compressing of the MSB frame includes losslessly compressing the MSB frame.

9. The method of claim 1, wherein the multi-bit frame is a 16-bit frame, the MSB frame is an 8-bit MSB frame, and the LSB frame is an 8-bit LSB frame.

10. The method of claim 1, embodied as computer-executable instructions on at least one non-transitory computer-readable medium.

11. A method comprising:
receiving, by a second physical computing device of a virtual reality system from a first physical computing device of the virtual reality system by way of a network interface, surface data for a three-dimensional ("3D") scene captured by a capture device physically disposed at a vantage point in relation to the 3D scene, the surface data including a plurality of two-dimensional ("2D") color frames, a compressed most significant byte ("MSB") depth frame, and a least significant byte ("LSB") depth frame;
uncompressing, by the second physical computing device of the virtual reality system, the compressed MSB depth frame received by the second physical computing device of the virtual reality system; and
combining, by the second physical computing device of the virtual reality system, the uncompressed MSB depth frame with the LSB depth frame received by the second physical computing device of the virtual reality system into an instance of a multi-bit depth frame,
wherein
the LSB depth frame is received by the second physical computing device in raw form such that the LSB depth frame is not modified during a time period between when the LSB depth frame is separated from the MSB depth frame and when the LSB depth frame is received by the second physical computing device,
the MSB depth frame includes a first plurality of pixels, wherein each pixel included in the first plurality of pixels is represented by a first multi-bit value,
the LSB depth frame includes a second plurality of pixels, wherein each pixel included in the second plurality of pixels is represented by a second multi-bit value,
the instance of the multi-bit depth frame includes a third plurality of pixels, each pixel included in the third plurality of pixels being represented by a third multi-bit value;
each pixel included in the first plurality of pixels in the MSB frame represents a subset of bit positions from a corresponding third multi-bit value included in the instance of the multi-bit frame, and
each pixel included in the second plurality of pixels in the LSB frame represents remaining bit positions from the corresponding third multi-bit value included in the instance of the multi-bit frame that are not included in the subset of the bit positions.

12. The method of claim 11, further comprising:
performing, by the second physical computing device of the virtual reality system and subsequent to the second physical computing device receiving the surface data from the first physical computing device, a processing operation on the instance of the multi-bit depth frame, the processing operation resulting in a processed instance of the multi-bit frame;
separating, by the second physical computing device of the virtual reality system after the performing of the processing operation, the processed instance of the multi-bit depth frame into an additional MSB depth frame and an additional LSB depth frame;
compressing, by the second physical computing device of the virtual reality system, the additional MSB depth frame; and
transmitting, by the second physical computing device of the virtual reality system, the surface data to a third physical computing device of the virtual reality system by way of the network interface by transmitting the plurality of 2D color frames, the additional LSB depth frame, and the additional compressed MSB depth frame to the third physical computing device of the virtual reality system by way of the network interface.

13. The method of claim 12, wherein:
the first physical computing device is included in a 2D color and depth data capture facility of the virtual reality system;
the second physical computing device is included in a 2D color and depth data processing facility of the virtual reality system; and
the third physical computing device is included in a 2D color and depth data encoding facility of the virtual reality system.

14. The method of claim 12, further comprising:
receiving, by the third physical computing device of the virtual reality system, the plurality of 2D color frames, the additional LSB depth frame, and the compressed additional MSB depth frame that are transmitted by way of the network interface by the second physical computing device;
uncompressing, by the third physical computing device of the virtual reality system, the compressed additional MSB depth frame received by the third physical computing device of the virtual reality system; and
combining, by the third physical computing device of the virtual reality system, the uncompressed additional MSB depth frame with the additional LSB depth frame received by the third physical computing device of the virtual reality system into an additional instance of the multi-bit depth frame.

15. The method of claim 11, embodied as computer-executable instructions on at least one non-transitory computer-readable medium.

16. A system comprising:
a first physical computing device; and
a second physical computing device,
wherein the first physical computing device
acquires, from a capture device physically disposed at a vantage point in relation to a three-dimensional ("3D") scene, surface data for the 3D scene, the surface data including a first instance of a multi-bit frame that includes a first plurality of pixels, each pixel included in the first plurality of pixels being represented by a first multi-bit value,
separates the first instance of the multi-bit frame into a most significant byte ("MSB") frame and a least significant byte ("LSB") frame,
compresses the MSB frame, and
transmits the surface data to the second physical computing device by way of a network interface by transmitting the LSB frame and the compressed MSB frame to the second physical computing device, the LSB frame being transmitted to the second physical computing device in raw form such that the LSB frame is not modified during a time period between when the LSB frame is separated from the MSB frame and when the LSB frame is transmitted to the second physical computing device, wherein the MSB frame includes a second plurality of pixels, wherein each pixel included in the second plurality of pixels is represented by a second multi-bit value, the LSB frame includes a third plurality of pixels, wherein each pixel included in the third plurality of pixels is represented by a third multi-bit value, each pixel included in the second plurality of pixels in the MSB frame represents a subset of bit positions from a corresponding first multi-bit value included in the first instance of the multi-bit frame, and each pixel included in the third plurality of pixels in the LSB frame represents remaining bit positions from the corresponding first multi-bit value included in the first instance of the multi-bit frame that are not included in the subset of the bit positions.

17. The system of claim 16, wherein:
the second physical computing device:
    receives the LSB frame and the compressed MSB frame that are transmitted by way of the network interface by the first physical computing device; and
    uncompresses the compressed MSB frame received by the second physical computing device; and
    combines the uncompressed MSB frame with the LSB frame received by the second physical computing device into a second instance of the multi-bit frame.

18. The system of claim 17, wherein the second physical computing device further
    performs a processing operation on the second instance of the multi-bit frame after the second physical computing device receives the surface data from the first physical computing device, the processing operation resulting in a processed second instance of the multi-bit frame,
    separates, after the second physical computing device performs the processing operation, the processed second instance of the multi-bit frame into an additional MSB frame and an additional LSB frame,
    compresses the additional MSB frame, and
    transmits the surface data to a third physical computing device by way of an additional network interface by transmitting the additional LSB frame and the additional compressed MSB frame to the third physical computing device.

19. The system of claim 16, wherein the multi-bit frame represents depth data captured by the capture device from the vantage point in relation to the 3D scene.

20. The system of claim 16, wherein the surface data further includes a plurality of multi-bit frames that represent two-dimensional ("2D") color data captured by the capture device from the vantage point in relation to the 3D scene.

* * * * *